US010558081B2

(12) United States Patent
Sasaki

(10) Patent No.: US 10,558,081 B2
(45) Date of Patent: Feb. 11, 2020

(54) LIGHT REFLECTION DEVICE AND LIGHT SOURCE DEVICE

(71) Applicant: SAKAI DISPLAY PRODUCTS CORPORATION, Sakai-shi, Osaka (JP)

(72) Inventor: Tomoo Sasaki, Sakai (JP)

(73) Assignee: SAKAI DISPLAY PRODUCTS CORPORATION, Sakai-shi, Osaka (JP)

( * ) Notice: Subject to any disclaimer, the term of this patent is extended or adjusted under 35 U.S.C. 154(b) by 0 days.

(21) Appl. No.: 16/307,917

(22) PCT Filed: Jun. 8, 2016

(86) PCT No.: PCT/JP2016/067113
§ 371 (c)(1),
(2) Date: Feb. 15, 2019

(87) PCT Pub. No.: WO2017/212589
PCT Pub. Date: Dec. 14, 2017

(65) Prior Publication Data
US 2019/0310520 A1  Oct. 10, 2019

(51) Int. Cl.
*G02F 1/1335* (2006.01)
*F21V 7/00* (2006.01)
(Continued)

(52) U.S. Cl.
CPC .......... *G02F 1/133611* (2013.01); *F21V 7/00* (2013.01); *F21V 7/08* (2013.01);
(Continued)

(58) Field of Classification Search
CPC ......... G02F 1/133611; G02F 1/133603; G02F 1/133605; F21V 7/00; F21V 7/08; F21V 7/09; G02B 5/08
See application file for complete search history.

(56) References Cited

U.S. PATENT DOCUMENTS 4,218,727 A * 8/1980 Shemitz ................ F21V 7/0008
362/290
7,665,872 B2 * 2/2010 Nakabayashi ....... F21S 48/1104
362/519
(Continued)

FOREIGN PATENT DOCUMENTS

JP   2013-097960 A   5/2013

*Primary Examiner* — Anabel Ton
(74) *Attorney, Agent, or Firm* — ScienBiziP, P.C.

(57) ABSTRACT

This light reflection device comprises: first reflective surfaces (157) whereby light from an exit surface S of a light source (151) is reflected; and second reflective surfaces (160) whereby the light reflected at the first reflective surfaces (157) is reflected in the exiting direction of the light from the exit surface S. In a plane containing a light axis L of the light source (151), the first reflective surfaces (157) have a shape wherein portions from two ellipses E1, E2 are connected at the light axis L, first focal points F1 from the respective ellipses E1, E2 being disposed on the second reflective surfaces (160). If the light source (151) is disposed in such a manner that, in the plane, second focal points F2 from the respective ellipses E1, E2 are positioned on the surface S, the angle between the light axis L of the light source (151) and the orientation of the reflected light on the second reflective surfaces (160) is less than 90°.

9 Claims, 13 Drawing Sheets

(51) Int. Cl.
  *F21V 7/09* (2006.01)
  *G02B 5/08* (2006.01)
  *F21V 7/08* (2006.01)

(52) U.S. Cl.
  CPC .................. *F21V 7/09* (2013.01); *G02B 5/08* (2013.01); *G02F 1/133603* (2013.01); *G02F 1/133605* (2013.01)

(56) References Cited

U.S. PATENT DOCUMENTS

| | | | | |
|---|---|---|---|---|
| 7,674,018 | B2* | 3/2010 | Holder | F21K 9/00 362/311.06 |
| 7,753,564 | B2* | 7/2010 | Cheng | F21K 9/00 362/311.01 |
| 8,042,965 | B2* | 10/2011 | Peng | G02F 1/133603 362/249.02 |
| 8,042,971 | B2* | 10/2011 | Medendorp, Jr. | F21S 8/06 362/243 |
| 8,573,815 | B2* | 11/2013 | Mallory | F21S 8/088 362/311.01 |
| 8,585,253 | B2* | 11/2013 | Duong | A01G 7/045 362/237 |
| 8,596,841 | B2* | 12/2013 | Yagi | F21V 5/045 362/509 |
| 8,814,392 | B1* | 8/2014 | Lipowsky | G02B 1/105 359/599 |
| 8,840,280 | B2* | 9/2014 | Kuo | G02B 19/0028 362/249.02 |
| 8,905,595 | B2* | 12/2014 | Shastry | F21V 5/007 362/153.1 |
| 8,919,980 | B2* | 12/2014 | Lin | G02B 6/0068 362/244 |
| 8,939,627 | B2* | 1/2015 | Yatsuda | F21S 45/48 362/547 |
| 8,979,321 | B2* | 3/2015 | Hukkanen | F21V 5/04 362/308 |
| 9,086,517 | B2 | 7/2015 | Fukuda et al. | |
| 2006/0098450 | A1* | 5/2006 | Iwasaki | F21S 41/147 362/545 |
| 2006/0193146 | A1* | 8/2006 | Li | F21V 7/0025 362/551 |
| 2008/0266873 | A1* | 10/2008 | Chang | G02B 6/0021 362/309 |
| 2009/0086498 | A1* | 4/2009 | Condon | B60Q 1/32 362/477 |
| 2009/0237943 | A1* | 9/2009 | Schmidt | F21V 3/04 362/311.02 |
| 2009/0296407 | A1* | 12/2009 | Bailey | F21V 5/04 362/309 |
| 2010/0265721 | A1* | 10/2010 | Zhou | F21K 9/00 362/311.01 |
| 2011/0188244 | A1* | 8/2011 | Hong | F21V 5/00 362/235 |
| 2011/0235338 | A1* | 9/2011 | Chen | F21V 5/04 362/311.02 |
| 2013/0033876 | A1* | 2/2013 | Venturini | F21V 5/04 362/311.02 |
| 2013/0107542 | A1 | 5/2013 | Fukuda et al. | |
| 2014/0002281 | A1* | 1/2014 | Jafrancesco | F21S 43/30 340/985 |
| 2014/0009944 | A1* | 1/2014 | Fukuda | F21V 5/046 362/311.08 |
| 2014/0254134 | A1* | 9/2014 | Pelka | F25D 27/00 362/92 |
| 2014/0286017 | A1* | 9/2014 | Morgan | G01J 1/0414 362/308 |
| 2015/0184826 | A1* | 7/2015 | Hu | G02B 19/0028 362/97.1 |
| 2015/0192275 | A1* | 7/2015 | Seo | G02F 1/133603 362/97.1 |
| 2015/0241020 | A1* | 8/2015 | Lee | G02F 1/133603 362/308 |
| 2015/0377426 | A1* | 12/2015 | Ogata | G02F 1/133611 362/311.01 |
| 2016/0047531 | A1* | 2/2016 | Hsiao | F21V 7/0058 362/240 |
| 2016/0109093 | A1* | 4/2016 | Hsiao | F21V 7/0008 362/297 |
| 2016/0186959 | A1* | 6/2016 | Kim | F21V 5/04 362/311.02 |
| 2019/0049793 | A1* | 2/2019 | Teragawa | G02F 1/133608 |

\* cited by examiner

LIGHT REFLECTION DEVICE AND LIGHT SOURCE DEVICE

TECHNICAL FIELD

The present invention relates to a light reflection device and a light source device for reflecting light emitted from a light exit surface of a light source.

BACKGROUND ART

Direct-lit light source apparatuses having a plurality of light-emitting diodes as a light source have become widespread lately in the field of liquid-crystal display apparatuses. In a direct-lit light source apparatus, a plurality of light emitting diodes (LEDs) are arranged in a matrix on a substrate, and a diffusing lens is for example provided over each LED for diffusing light emitted from the LED. The light diffused by the diffusing lens is further diffused by a diffusion plate, and then enters a liquid-crystal panel, for example.

In the case of the use of a diffusing lens formed by injection molding, which involves injection of resin to an injection mold through an injection port, the diffusing lens has an injection-port-shape impression on an outer circumferential section of a light exit surface thereof, and the injection-port-shape impression causes undesired light scattering.

Patent Literature 1 discloses a light flux control member (a diffusing lens) that can inhibit the above-described light scattering on an injection-port-shape impression without the need to extremely reduce a thickness of the injection port.

CITATION LIST

Patent Literature

[Patent Literature 1]
Japanese Patent Application Laid-Open Publication No. 2013-97960

SUMMARY OF INVENTION

Technical Problem

Light emitted from an LED and diffused using a diffusing lens spreads in a toroidal manner. Accordingly, the light diffused using the diffusing lens results in an uneven light flux distribution. The use of diffusing lenses to diffuse light therefore causes non-uniform luminance when the thus diffused light has entered a liquid-crystal panel.

However, nothing has been done in the light flux control member disclosed in Patent Literature 1 to address the non-uniform luminance due to LED light spreading in a toroidal manner through the diffusing lens. The problem therefore remains unsolved.

The present invention has been made in view of the circumstances described above, and an object thereof is to provide a light reflection device and a light source device that are capable of achieving an even light flux distribution compared to conventional technology and inhibiting occurrence of non-uniform luminance by performing specific reflection of light from a light source.

Solution to Problem

A light reflection device according to an embodiment of the present invention includes a first reflection surface and a second reflection surface. The first reflection surface reflects light from a light exit surface of a light source. The second reflection surface reflects the light reflected by the first reflection surface in a direction of light emission from the light exit surface. The first reflection surface has a shape including two portions of respective ellipses on a plane including an optical axis of the light source. The two portions are joined at the optical axis. A first focus of each of the ellipses is located on the second reflection surface. An angle between the optical axis of the light source and the direction of the light reflected by the second reflection surface is less than 90° on the plane including the optical axis when the light source is in a position that allows a second focus of each of the ellipses to be located on the light exit surface.

Since one of the foci of each of the specific ellipses is present on the second reflection surface, light from the light exit surface of the light source is reflected by the first reflection surface toward the second reflection surface as long as the light reflection device according to the embodiment of the present invention is disposed relative to the light source such that another of the foci of each of the specific ellipses is located on the light exit surface of the light source. Since the angle between the optical axis of the light source and the light reflected by the second reflection surface is less than 90°, the light emitted by the light source and then reflected by the first reflection surface is reflected by the second reflection surface in the direction of light emission from the light exit surface.

Advantageous Effects of Invention

The present invention can achieve an even light flux distribution of light from a light source compared to conventional technology and inhibit occurrence of non-uniform luminance. The present invention can omit an optical member for diffusing the light from the light source, and thus allow for apparatus downsizing and manufacturing cost reduction.

DESCRIPTION OF EMBODIMENTS

The following describes a light reflection device and a light source device according to an embodiment of the present invention in detail with reference to the accompanying drawings using a television receiver including a liquid-crystal panel as an example.

Embodiment 1

Figure 1:
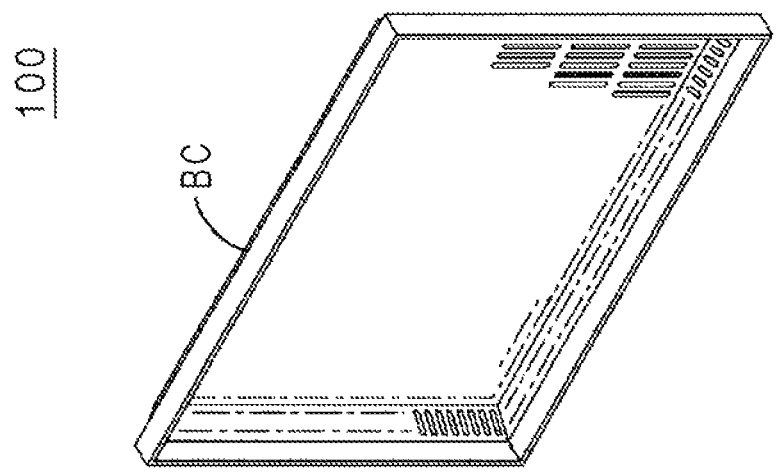
FIG. 1 is an exploded perspective view illustrating a main portion of a television receiver according to Embodiment 1.
Figure 1:
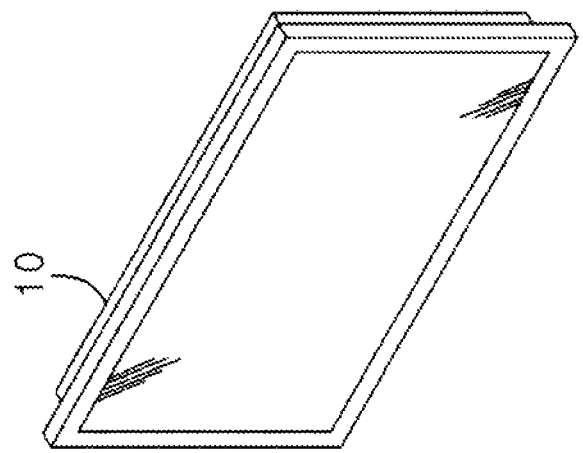
Figure 1:
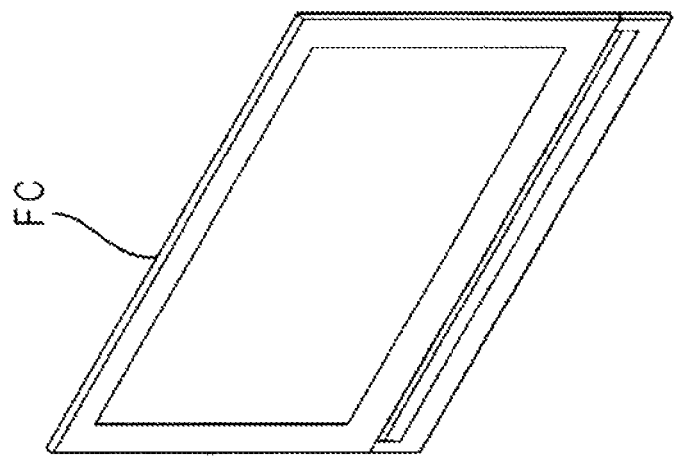

FIG. 1 is an exploded perspective view illustrating a main portion of a television receiver 100 according to Embodiment 1. The television receiver 100 according to the present embodiment includes a liquid-crystal display apparatus 10, and a front cabinet FC and a back cabinet BC for accommodating and holding the liquid-crystal display apparatus 10 therebetween. The liquid-crystal display apparatus 10 is schematically illustrated as a rectangular plate-shaped structure.

Figure 2:
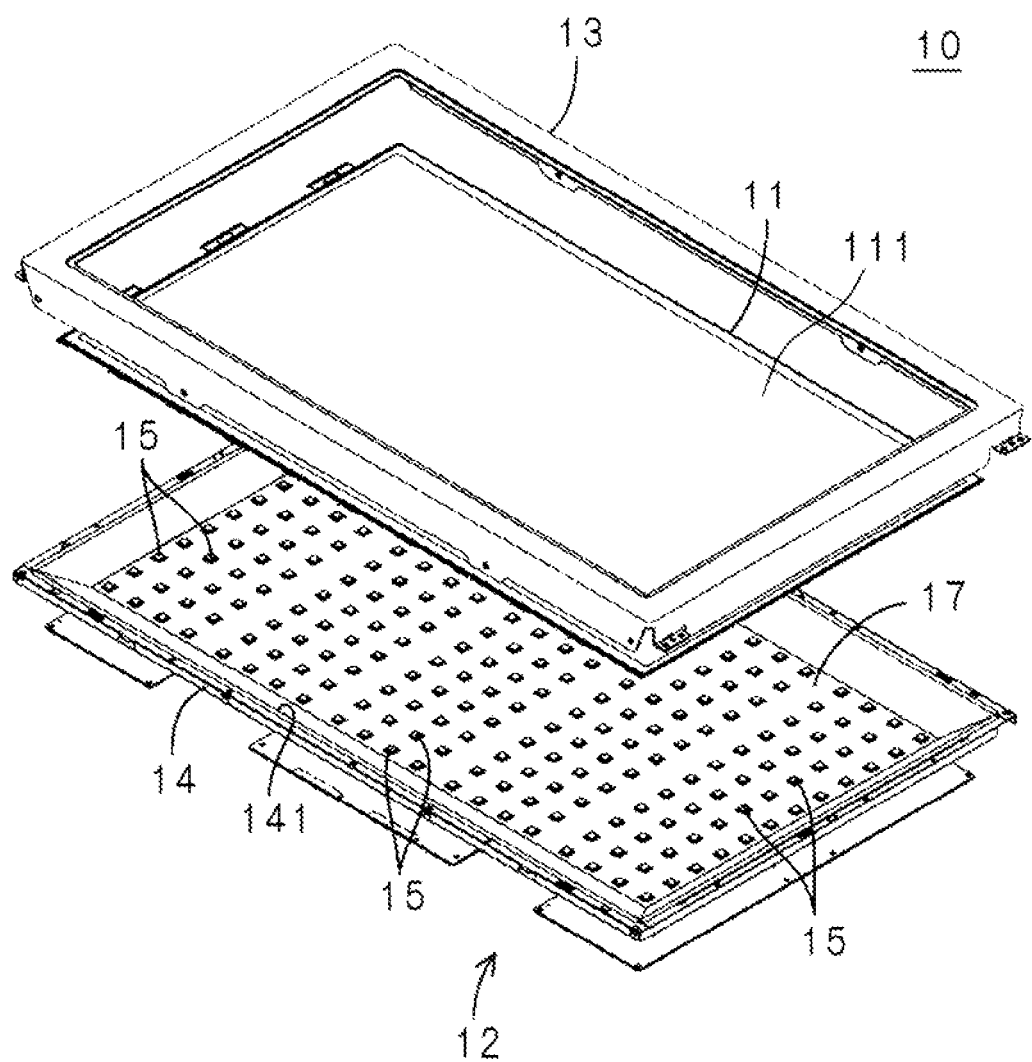
FIG. 2 is an exploded perspective view illustrating a main portion of a liquid-crystal display apparatus in the television receiver according to Embodiment 1.

FIG. 2 is an exploded perspective view illustrating a main portion of the liquid-crystal display apparatus 10 in the television receiver 100 according to Embodiment 1. The liquid-crystal display apparatus 10 includes a liquid-crystal panel 11, a light source apparatus 12, and a bezel 13. The bezel 13 functions as a frame that holds the liquid-crystal panel 11 and the light source apparatus 12.

The liquid-crystal panel 11 has a display surface 111 on which images and pictures are displayed. Hereinafter, a direction from the liquid-crystal display apparatus 10 toward the front cabinet FC is referred to as a "front" direction, and an opposite direction (a direction from the liquid-crystal display apparatus 10 toward the back cabinet BC) is referred to as a "back" direction. A thickness direction of the television receiver 100 is referred to as a front-back direction.

The light source apparatus 12 includes a box-shaped chassis 14 having an opening in a front side. The liquid-crystal panel 11 is disposed so as to cover an opening edge 141 that defines the front opening of the chassis 14.

Light source devices 15, substrates 16 described below each having a front surface (a mounting surface 161 described below) with the light source devices 15 mounted thereon, and a reflection sheet 17 for reflecting light emitted from the light source devices 15 toward the liquid-crystal panel 11 are provided within the chassis 14. As such, the light source apparatus 12 according to the present embodiment is a so-called direct-lit light source apparatus in which the light source devices 15 in the chassis 14 are located directly under the liquid-crystal panel 11.

Figure 3:
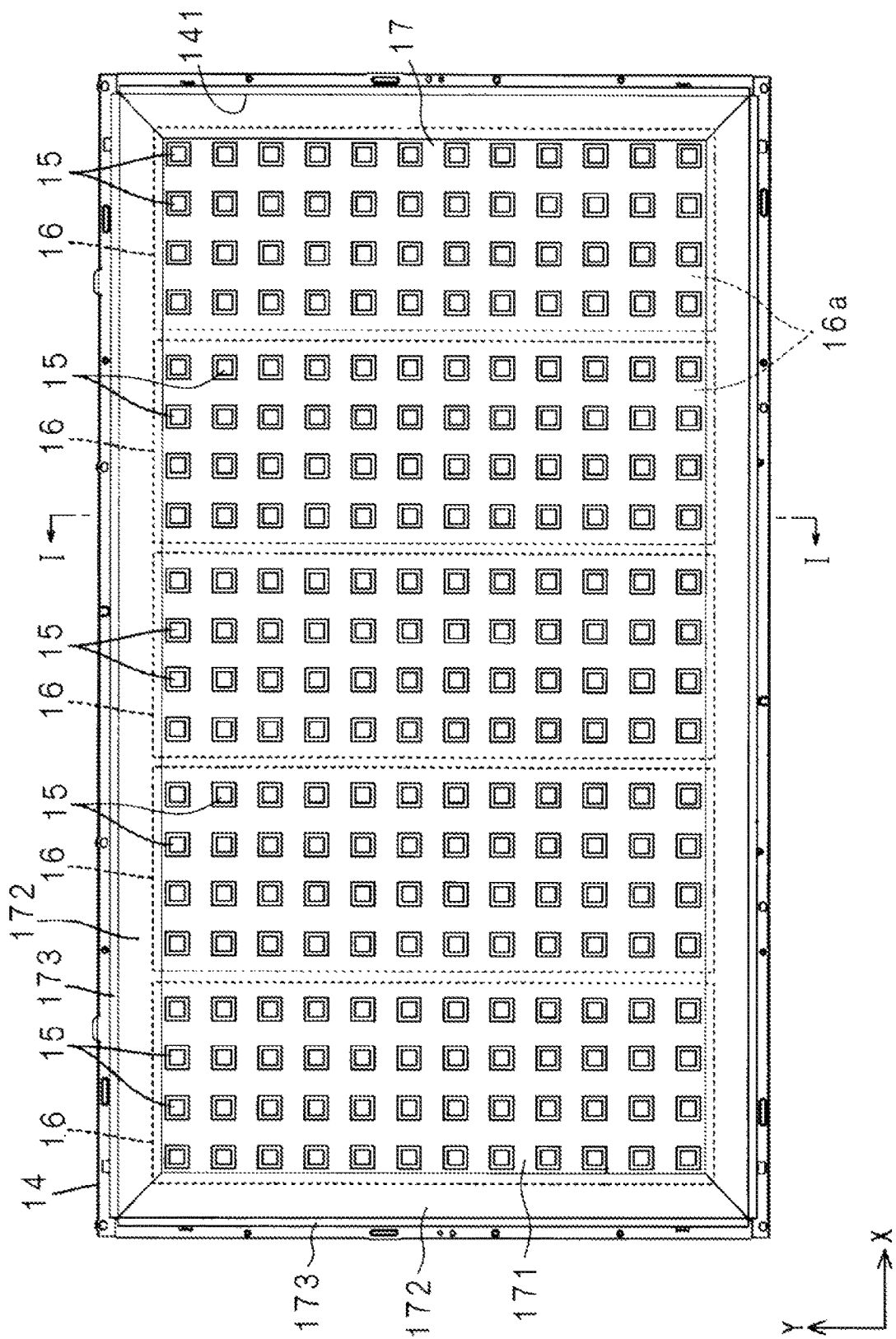
FIG. 3 is an elevation view of a light source apparatus in a plane orthogonal to a front-back direction of the television receiver according to Embodiment 1 as seen from the front.
Figure 4:
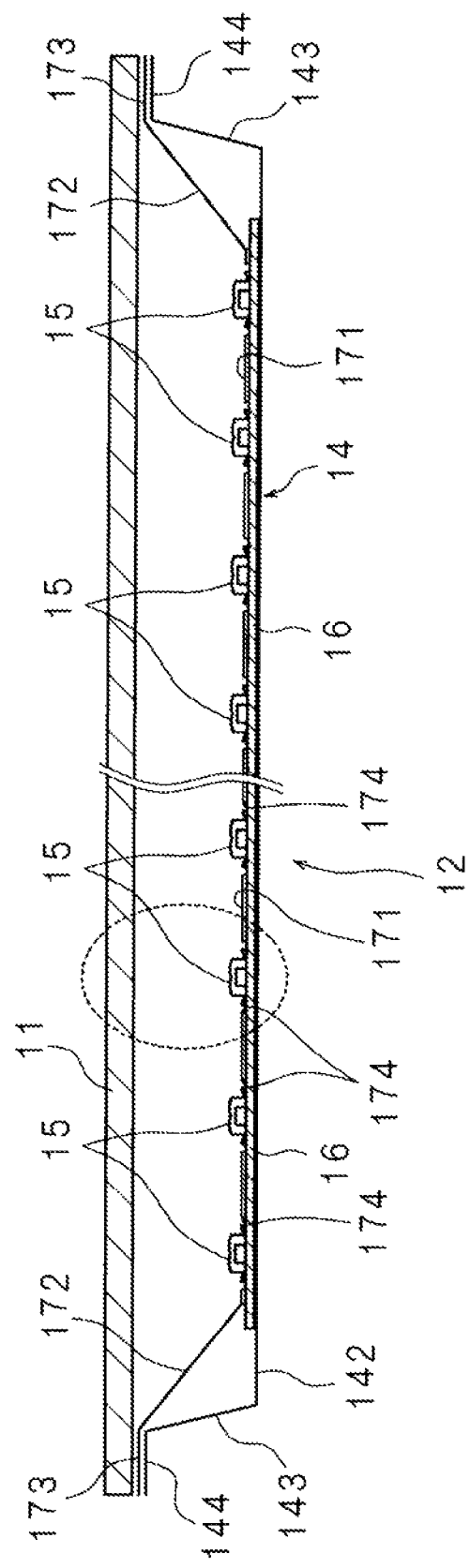
FIG. 4 is a cross-sectional view taken along line I-I in FIG. 3.

FIG. 3 is an elevation view (also referred to below as a front elevation view) of the light source apparatus 12, as seen from the front, in a plane (an xy plane in FIG. 3) orthogonal to the front-back direction of the television receiver 100 according to Embodiment 1. FIG. 4 is a cross-sectional view taken along line I-I in FIG. 3. For convenience of illustration, the bezel 13 is not shown in FIG. 4.

The chassis 14 is for example made of a metal plate such as an aluminum plate or a zinc electro-galvanized steel plate. The chassis 14 has a rectangular bottom plate 142, a side plate 143 protruding frontward from a periphery of the bottom plate 142, and a backing plate 144 extending outward from front edges (equivalent to the opening edge 141 of the chassis 14) of the side plate 143 in a front elevation view. The backing plate 144 holds an extending portion 173 of the reflection sheet 17 described below and a periphery portion of the liquid-crystal panel 11.

The substrates 16 are disposed on a front surface of the bottom plate 142. The backing plate 144 in a front elevation view is in the shape of a rectangular frame having a central opening and receives mounting of the extending portion 173 of the reflection sheet 17.

The reflection sheet 17 is for example made from a synthetic resin and is disposed with a surface having a white color, which is highly light reflective, facing frontward. The reflection sheet 17 covers areas of the substrates 16 and the bottom plate 142 substantially entirely except regions having the light source devices 15 mounted thereon. Light emitted by the light source devices 15 is therefore reflected by the reflection sheet 17 toward the liquid-crystal panel 11.

More specifically, the reflection sheet 17 has a rectangular bottom portion 171 that covers the bottom plate 142 and the substrates 16, an inclined wall portion 172 spreading outward and frontward from a periphery of the bottom portion 171, and the extending portion 173 extending outward from a front end (corresponding to the opening edge 141 of the chassis 14) of the inclined wall portion 172 in a front elevation view. The extending portion 173 in the front elevation view is in the shape of a rectangular frame having a central opening and is disposed on the backing plate 144 of the chassis 14. The extending portion 173 receives mounting of the periphery portion of the liquid-crystal panel 11.

The bottom portion 171 is disposed over the mounting surfaces 161 of the substrates 16 described below. The bottom portion 171 has through holes 174 through which the respective light source devices 15 are inserted. The through holes 174 are arranged in a matrix in one-to-one correspondence with the light source devices 15 arranged in a matrix.

Figure 5:
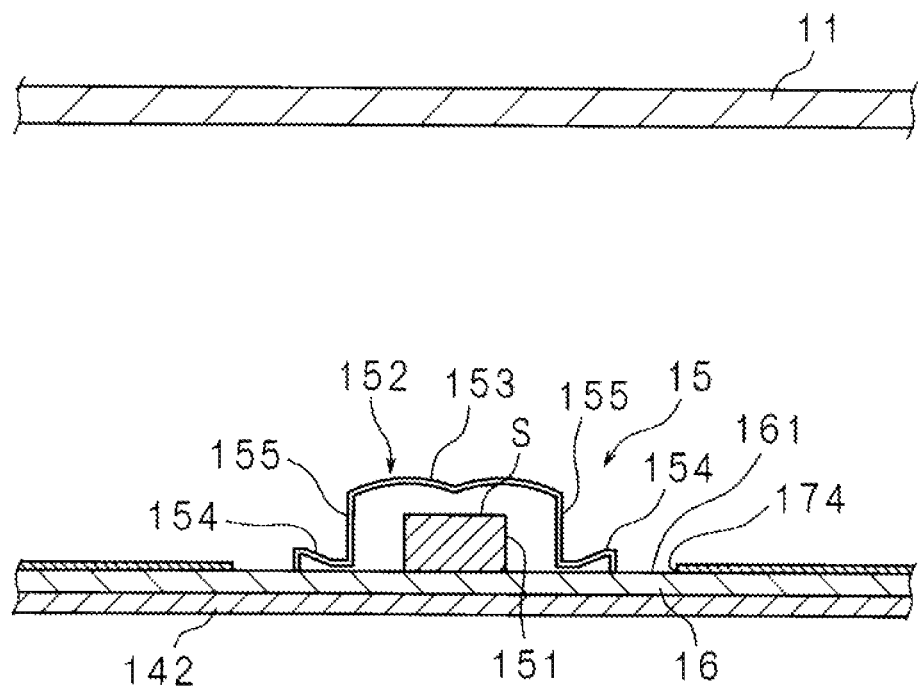
FIG. 5 is an enlarged view of a region indicated by a dashed ellipse in FIG. 4.

FIG. 5 is an enlarged view of a region indicated by a dashed ellipse in FIG. 4. FIG. 5 illustrates one of the light source devices 15 in an enlarged manner. The light source device 15 is mounted on one of the substrates 16. Specifically, the light source device 15 is mounted on the mounting surface 161 of the substrate 16.

Each of the substrates 16 is in the shape of a rectangular strip. As illustrated in FIG. 3, five substrates 16 are arranged in an X direction on the bottom plate 142 of the chassis 14 with a longitudinal direction thereof parallel to a Y direction. The substrates 16 are for example made from the same metal material as the chassis 14 such as an aluminum material, and the mounting surfaces 161 each have a reflection layer (not shown) having a white color. The light source devices 15 are arranged in a matrix on the mounting surfaces 161 of the substrates 16 as described above.

Each of the light source devices 15 has a light emitting diode (LED) 151 and a light reflection device 152 disposed on the mounting surface 161 so as to cover the LED 151. The light reflection device 152 reflects light emitted by the LED 151 twice thereby to irradiate the reflected light onto the liquid-crystal panel 11.

Figure 6:
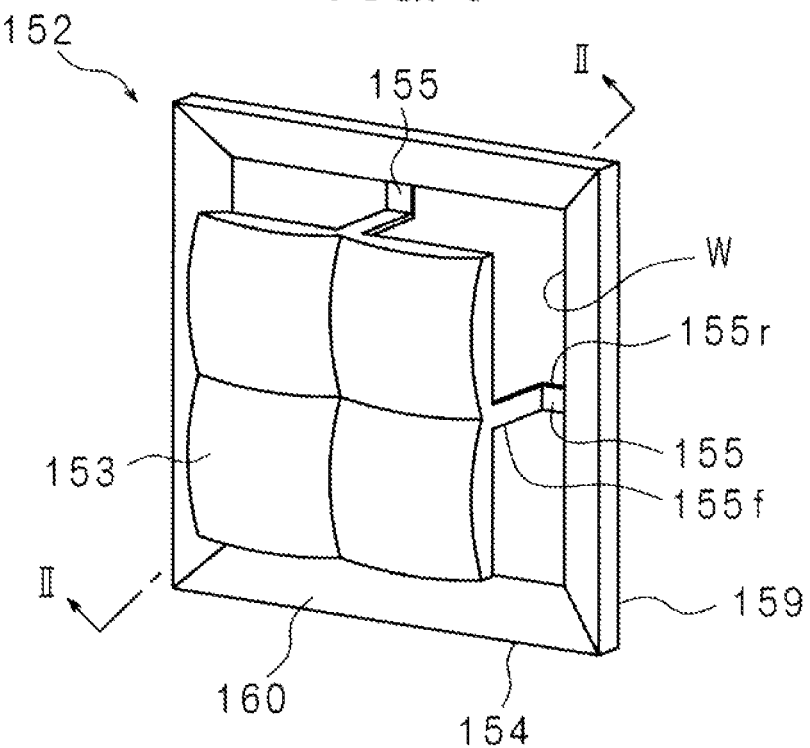
FIG. 6 is a perspective view illustrating an external appearance of a light reflection device in the television receiver according to Embodiment 1 as seen from the front.
Figure 7:
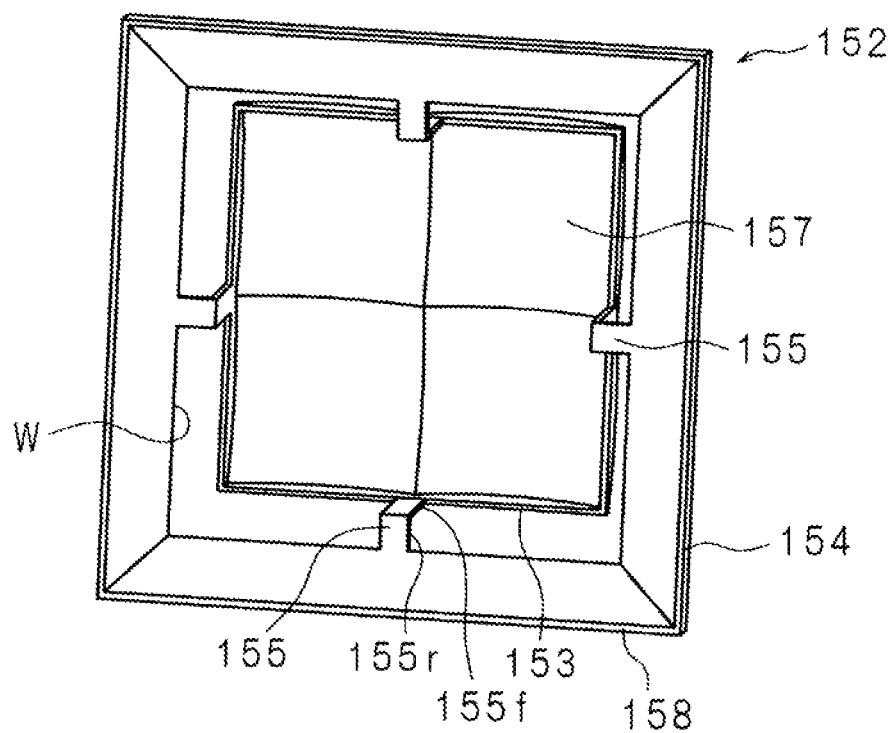
FIG. 7 is a perspective view illustrating an external appearance of a light reflection device in the television receiver according to Embodiment 1 as seen from the back.

FIG. 6 is a perspective view illustrating an outer side (an external appearance as seen from the front) of the light reflection device 152 included in the light source apparatus 12 of the television receiver 100 according to Embodiment 1. FIG. 7 is a perspective view illustrating an inner side (an external appearance as seen from the back) of the light reflection device 152.

The light reflection device 152 has a first reflection section (a roof) 153 that primarily reflects light emitted from the LED 151, and a second reflection section (a reflection section) 154 that receives the light reflected by the first reflection section 153 and secondarily reflects the received light toward the liquid-crystal panel 11. The first reflection section 153 is located frontward of the second reflection section 154 in the front-back direction.

As illustrated in FIG. 5, in the light reflection device 152 disposed so as to cover the LED 151 in the television receiver 100 according to Embodiment 1, the first reflection section 153 is located in the vicinity of a light exit surface S of the LED 151 from which light exits, and the centroid of a shape of the first reflection section 153 is located on the normal line to the centroid of a shape of the light exit surface S in a front elevation That is, the centroid of the shape of the first reflection section 153 is located on an optical axis of the LED 151 in a front elevation view. The first reflection section 153 has a first reflection surface 157 facing the light exit surface S of the LED 151, and the first reflection surface 157 reflects light emitted from the LED 151 toward the second reflection section 154.

As illustrated in FIG. 6, the shape of the first reflection section 153 is formed of joined four protrusions having the same shape, among which two adjacent protrusions are symmetric about a joining plane thereof. The shape of the first reflection section 153 is substantially square in a front elevation view. Each protrusion is substantially arch-shaped and has an outer surface projecting outward. The first reflection surface 157 is inner surfaces (hack surfaces) of the four protrusions, and thus includes four concave surfaces having the same shape.

That is, the first reflection section 153 in the television receiver 100 according to Embodiment 1 is quartered into the four protrusions by two planes that perpendicularly intersect with each other at the optical axis of the LED 151 passing through the centroid of the first reflection section 153. The inner surfaces (the first reflection surface 157) of two adjacent protrusions among the four protrusions are joined at one of the two planes (i.e., planes each including the optical axis of the LED 151).

As illustrated in FIG. 6, the second reflection section 154 is in the shape of a square frame having a central opening in a front elevation view. Both of the centroid of a square defining an inner periphery of the frame and the centroid of a square defining an outer periphery of the frame coincide with the centroid of a square defining a periphery of the first reflection section 153. That is, the second reflection section 154 has an opening W having a square shape similar to a shape defined by the periphery of the first reflection section 153 in a front elevation view. The opening W has a size slightly larger than an area defend by the periphery of the first reflection section 153.

The second reflection section 154 has a surrounding surface 159 that surrounds the LED 151 when the light reflection device 152 is in the light source apparatus 12 and an inclined surface 160 (a second reflection surface) continuous from a front end of the surrounding surface 159. The inclined surface 160 is inclined from the outer periphery toward the inner periphery of the square frame having a central opening in a front elevation view of the second reflection section 154. That is, a distance from an outer periphery of the inclined surface 160 to the mounting surface 161 is longer than a distance from an inner periphery of the inclined surface 160 to the mounting surface 161.

The surrounding surface 159 is in contact with the mounting surface 161 at a back end thereof. The second reflection section 154 further has a fixing surface 158 (a contact surface) that is continues from the back end of the surrounding surface 159 and that assists mounting of the light reflection device 152. The inclined surface 160 functions as the second reflection surface that reflects toward the liquid-crystal panel 11 light reflected by the first reflection surface 157. The inclined surface 160 is also referred to below as the second reflection surface 160. The first reflection surface 157 and the second reflection surface 160 for example have silver plating or coating of a highly reflective material such as $TiO_2$.

As described above, in a front elevation view, the shape defined by the periphery of the first reflection section 153 is square, and the inclined surface 160 of the second reflection section 154 is in the shape of a square having a central opening. Centers of edges of the first reflection section 153 are respectively connected with centers of edges of the inner periphery of the second reflection section 154 by four legs 155. That is, the light reflection device 152 includes the first reflection section 153, the legs 155 for positioning the first reflection section 153 with the first reflection surface 157 facing the light exit surface S of the LED 151, and the second reflection section 154 having the second reflection surface 160. The first reflection surface 157 is the inner surface of the first reflection section 153. Each leg 155 has a first end connected with the periphery of the first reflection section 153 and a second end connected with the second reflection section 154.

The legs 155 are arranged at intervals on the respective edges of the first reflection section 153 and the respective edges of the second reflection section 154. As a result of the legs 155 being arranged at intervals, it is possible to form openings for successfully guiding the light reflected by the first reflection surface 157 toward the second reflection surface 160. Each leg 155 is L-shaped and formed from for example a light transmissive material. The use of the legs 155 formed from a light transmissive material eliminates the need to form the openings for guiding the light reflected by the first reflection surface 157 toward the second reflection surface 160. A front end 155f (the first end) of each leg 155 is connected with the periphery of the first reflection section 153, and a back end 155r (the second end) thereof is connected with the inner periphery of the second reflection section 154. Thus, a constant space between the first reflection section 153 and the second reflection section 154 is maintained with the first reflection surface 157 of the first reflection section 153 and the light exit surface S of the LED 151 facing each other.

The first reflection section 153, the second reflection section 154, and the legs 155 are formed as one structure by for example three-dimensional printing or injection molding. It is therefore possible to position the first reflection section 153 only by positioning the second reflection section 154. The first reflection section 153 and the second reflection section 154 may be formed using highly reflective polycarbonate.

A point of exit of light on the light exit surface S of the LED 151 and a point on the second reflection surface 160 of the second reflection section 154 in the light source device 15 having the above-described configuration are two foci of a specific ellipse, That is, a first focus (F1) of the specific ellipse is present on the second reflection surface 160 of the second reflection section 154, and a second focus (F2) of the specific ellipse is present on the light exit surface S of the LED 151. On a cross-section of the first reflection section 153 taken along a plane including the two foci, an intersection line between the first reflection surface 157 and the plane matches the specific ellipse, There are an infinite number of ellipses each having the point of exit of light on the light exit surface S as the first focus F1 and a point on the second reflection surface 160 as the second focus F2. Accordingly, the first reflection surface 157 of the first reflection section 153 is formed as concave surfaces obtained by integrating arcs of such an infinite number of ellipses.

As described above, in the television receiver 100 according to Embodiment 1, the inner surfaces (the first reflection surface 157) of two adjacent protrusions among the four protrusions forming the first reflection section 153 are joined at a plane including the optical axis of the LED 151. That is, on each plane including the optical axis of the LED 151, the first reflection surface 157 has a shape including two curves (portions of ellipses) joined at the optical axis.

Since the shape of the first reflection section 153 according to Embodiment 1 is formed of the joined four protrusions having the same shape, the joined two curves (portions of ellipses) of the first reflection surface 157 on each plane including the optical axis of the LED 151 are symmetric about the optical axis.

Accordingly, in the light source device 15, the light itted from the light exit surface S of the LED 151 is reflected by the first reflection surface 157 of the first reflection section 153, reaches the second reflection surface 160 of the second reflection section 154 without fail, and is reflected by the second reflection surface 160 toward the liquid-crystal panel 11. It is possible to successfully position the second focus (F2) on the light exit surface S of the LED 151 by adjusting the length of the legs 155.

Figure 8:
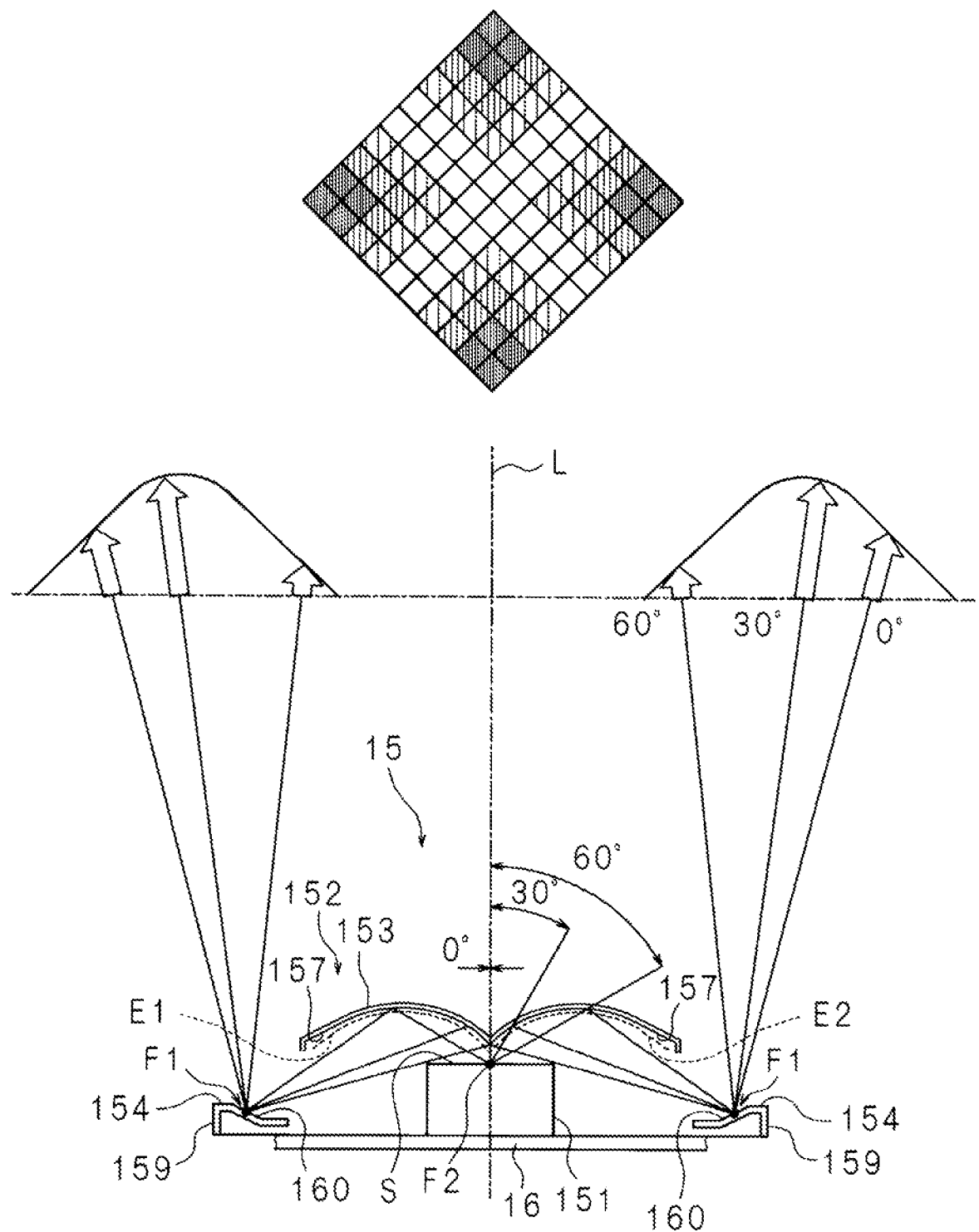
FIG. 8 is a diagram illustrating light paths in a light source device and a light flux distribution on a liquid-crystal panel in the television receiver according to Embodiment 1.

FIG. 8 is a diagram illustrating light paths in the light source device 15 and a light flux distribution on the liquid-crystal panel 11 in the television receiver 100 according to Embodiment 1. FIG. 8 is a cross-sectional view taken along line II-II in FIG. 6. In FIG. 8, light flux density differences are indicated by gradation, and a higher light flux density, which in other words is a higher luminance, is indicated by a darker shade.

The first reflection surface 157 of the first reflection section 153 has a shape including portions of ellipses E1 and E2 joined at an optical axis L on a plane including the optical axis L of the LED 151 as illustrated in FIG. 8.

Rays of light emitted from the light exit surface S (F2) of the LED 151 at respective angles of for example 0°, 30°, and 60° relative to the optical axis L are reflected by the first reflection surface 157, reach the second reflection surface 160 (F1), and then are reflected by the second reflection surface 160 toward the liquid-crystal panel 11. Angles between the optical axis L and directions of the rays of light reflected by the second reflection surface 160 are less than 90°.

A light flux density on the liquid-crystal panel 11 resulting from the use of such a light source device 15 shows a distribution having a higher light flux density in regions corresponding to corners of the periphery of the first reflection section 153 and having a lower light flux density in regions corresponding to joint portions of the protrusions of the first reflection section 153 as illustrated in FIG. 8.

Light from an LED with a diffusing lens in a conventional light source spreads in a toroidal manner to result in non-uniform luminance on a liquid-crystal panel. Conventional technology to solve such a problem is to dispose an optical sheet, a diffusion plate, or the like between the light source and the liquid-crystal panel to uniformly diffuse the light from the light source.

By contrast, the television receiver 100 according to Embodiment 1 achieves an even light flux distribution compared to that achieved by the conventional light source, because regions having an extremely low light flux density account for a small proportion as illustrated in FIG. 8. It is therefore possible to inhibit occurrence of non-uniform luminance on the liquid-crystal panel 11.

Since it is possible to inhibit non-uniform luminance on the liquid-crystal panel 11, it is possible to eliminate the need to use an optical sheet, a diffusion plate, or the like, reducing the thickness of the television receiver 100 in the front-back direction as well as reducing the device manufacturing cost.

The description has been given above using an example in which the second reflection section 154 is in the shape of a square frame having a central opening in a front elevation view. However, the television receiver 100 according to Embodiment 1 is not limited as such.

Light emitted from the light exit surface S of the LED 151 has directionality, and therefore many of rays of the light travel along the optical axis L and are reflected by a central region of the first reflection surface 157, so that most of rays of the thus reflected light are incident on corner sections of the second reflection surface 160. The second reflection section 154 may therefore have a configuration consisting only of the corner sections.

The description has been given above using a configuration as an example in which one light reflection device 152 is provided for each LED 151. However, the television receiver 100 according to Embodiment 1 is not limited as such. For example, another configuration may be employed in which a single light reflection device 152 is provided in combination with a plurality of LEDs 151.

Figure 9:
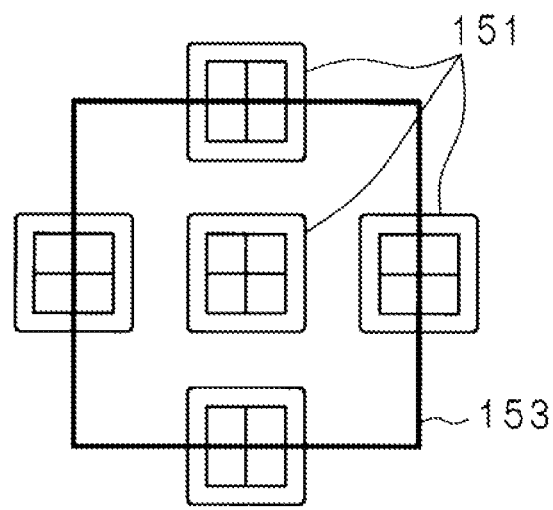
FIG. 9 is a diagram illustrating arrangement of LEDs in a configuration of the television receiver according to Embodiment 1 in which a single light reflection device is provided in combination with a plurality of LEDs.

FIG. 9 is a diagram illustrating arrangement of the LEDs 151 in a configuration of the television receiver 100 according to Embodiment 1 in which a single light reflection device 152 is provided in combination with a plurality of LEDs 151. For convenience of illustration, only an outline of the periphery of one first reflection section 153 is shown in FIG. 9.

As illustrated in FIG. 9, the first reflection section 153 is disposed such that some of the LEDs 151 are located in the vicinity of the periphery of the shape (square) of the first reflection section 153 in a front elevation view. Specifically, the center of each of the edges (four edges) of the periphery of the first reflection section 153 coincides with the centroid of the shape of one of the LEDs 151 in a front elevation view. Furthermore, the first reflection section 153 is disposed such that the centroid of one of the LEDs 151 coincides with the centroid of the shape of the first reflection section 153 in a front elevation view. Thus, five LEDs 151 are provided in total, including four LEDs 151 in the vicinity of the respective edges (four edges) of the periphery of the first reflection section 153 and one LED 151 in the vicinity of the centroid of the shape of the first reflection section 153 in a front elevation view.

The configuration described above in which a single light reflection device 152 is provided in combination with a plurality of LEDs 151 is achieved by disposing one LED 151 right above or in the vicinity of each of edges of a polygonal shape defined by the periphery of the light reflection device 152 and disposing one LED 151 on the optical axis of the LED 151.

Figure 10:
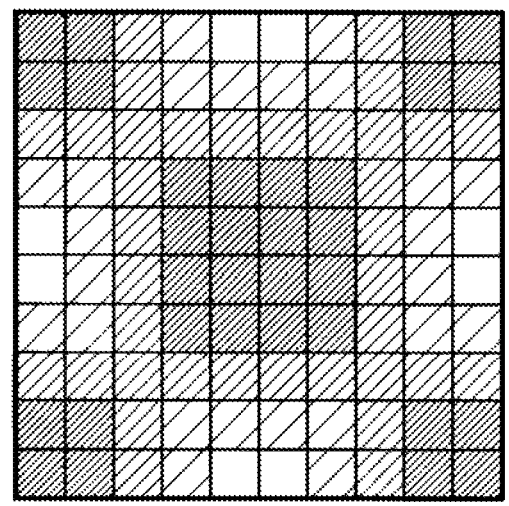
FIG. 10 is a diagram illustrating a light flux distribution resulting from a configuration of the television receiver according to Embodiment 1 in which a single light reflection device is provided in combination with five LEDs.

FIG. 10 illustrates a light flux distribution resulting from a configuration of the television receiver 100 according to Embodiment 1 in which a single light reflection device 152 is provided in combination with five LEDs 151.

The light flux density on the liquid-crystal panel 11 in such a configuration is higher in regions closer to regions corresponding to the corners of the periphery of the first reflection section 153 in the front-back direction and is also higher in regions closer to the centroid of the shape of the first reflection section 153 in a front elevation view, achieving an even light flux distribution compared to the configuration in which one light reflection device 152 is provided for each LED 151 (see FIG. 8).

The description has been given above using a configuration as an example in which the first reflection section 153 is formed of joined four protrusions having the same shape, and the shape defined by the periphery of the first reflection section 153 is square in a front elevation view. However, the television receiver 100 according to Embodiment 1 is not limited as such, and the shape defined by the periphery of the first reflection section 153 may be any polygonal shape in a front elevation view. That is, the periphery of the first reflection section 153 may define a polygonal shape expanding from the optical axis L of the LED 151 in directions orthogonal to the optical axis L.

For example, the first reflection section 153 may be formed of three protrusions having the same shape, and the shape defined by the periphery of the first reflection section 153 may be an equilateral triangle in a front elevation view. For another example, the first reflection section 153 may be formed of five protrusions having the same shape, and the shape defined by the periphery of the first reflection section 153 may be an equilateral pentagon in a front elevation view. For another example, the first reflection section 153 may be formed of six or more protrusions having the same shape.

In any configuration, the number of LEDs 151 provided for each first reflection section 153 is preferably one more than the number of edges of the periphery of the first reflection section 153 in a front elevation view as described above. For example, in a configuration in which the shape defined by the periphery of the first reflection section 153 is an equilateral triangle, the number of LEDs 151 provided for each first reflection section 153 is preferably four. In a configuration in which the shape defined by the periphery of the first reflection section 153 is an equilateral pentagon, the number of LEDs 151 provided for each first reflection section 153 is preferably six.

The television receiver 100 according to Embodiment 1 is not limited to the description given above also in other aspects. For example, the first reflection surface 157 may be formed by attaching a reflection film to the first reflection section 153, and the second reflection surface 160 may be formed by attaching a reflection film to the second reflection section 154. The second reflection surface 160 of the second reflection section 154 may be subjected to bead application or knurling.

Figure 11A:
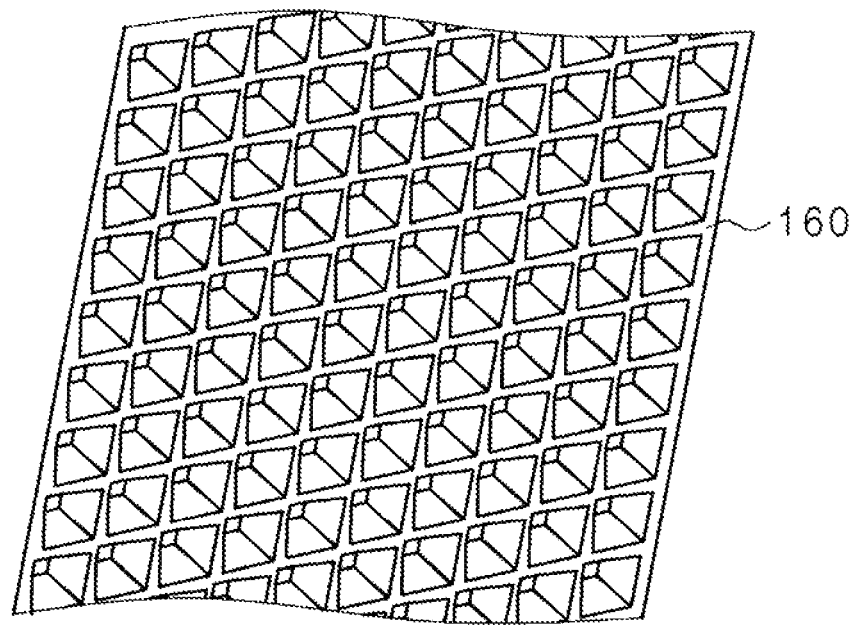
FIGS. 11A and 11B are diagrams illustrating a second reflection surface subjected to bead application and a second reflection surface subjected to knurling in the television receiver according to Embodiment 1.
Figure 11B:
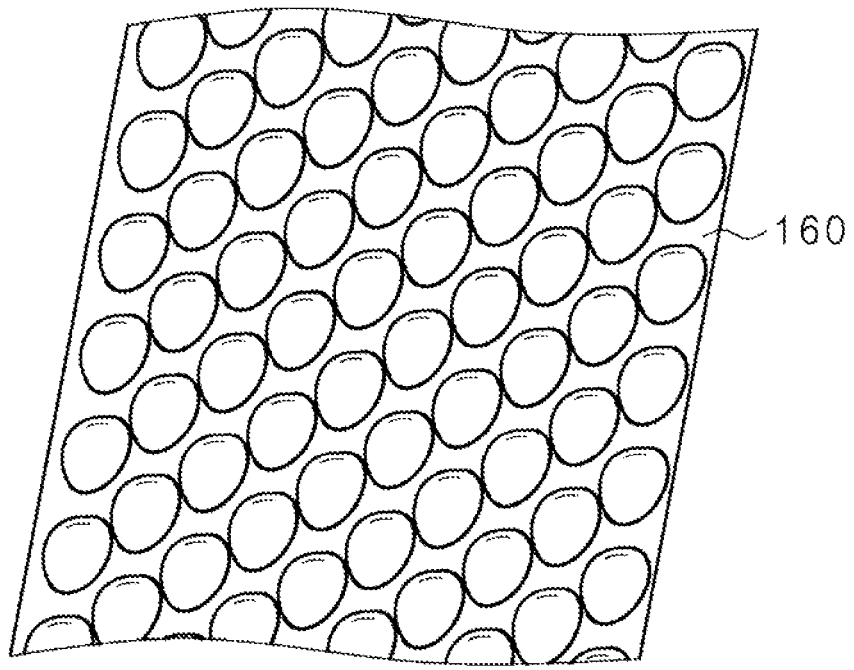

FIGS. 11A and 11B are diagrams illustrating the second reflection surface 160 subjected to bead application and the second reflection surface 160 subjected to knurling in the television receiver 100 according to Embodiment 1. FIG. 11A illustrates the second reflection surface 160 subjected to knurling, and FIG. 11B illustrates the second reflection surface 160 subjected to bead application.

Knurling is a known process of transferring a specific knurled pattern onto a surface of a workpiece by pressing a wheel having the specific knurled pattern against the surface of the workpiece. For example, the second reflection surface 160 subjected to knurling has pyramidal protrusions arranged in a matrix as illustrated in FIG. 11A. Such a structure can be formed through transferring using a mold.

For another example, semispherical beads mixed with a specific adhesive are applied, so that the semispherical beads are arranged in a matrix as illustrated in FIG. 11B. Such a stricture can also be formed through transferring using a mold.

The second reflection surface 160 subjected to bead application or knurling diffuses light incident on the second reflection surface 160, and then reflects the light toward the liquid-crystal panel 11, helping to achieve a more even light flux distribution on the liquid-crystal panel 11. Such an effect makes it possible to reduce the number of LEDs 151.

Embodiment 2

Figure 12:
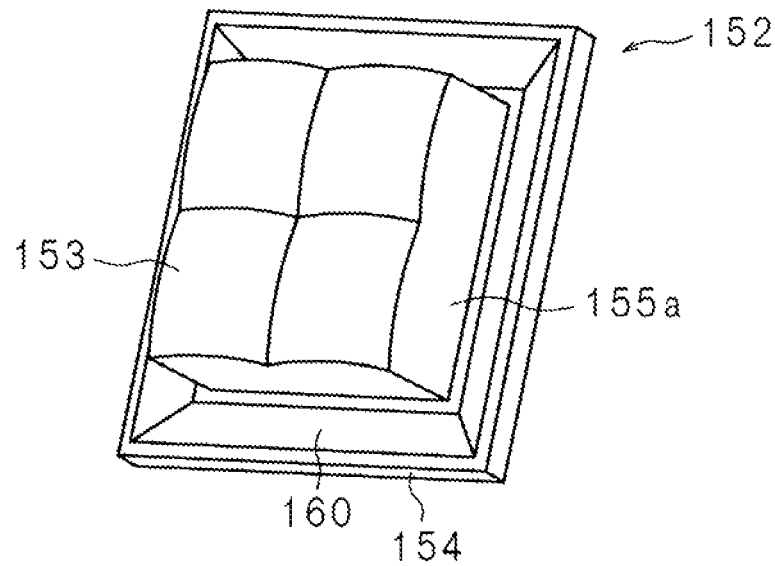
FIG. 12 is a perspective view illustrating an external appearance of a light reflection device mounted in a light source apparatus of a television receiver according to Embodiment 2 as seen from the front.

FIG. 12 is a perspective view illustrating an external appearance of a light reflection device 152 mounted in a light source apparatus 12 of a television receiver 100 according to Embodiment 2 as seen from the front.

The light reflection device 152 is made of a transparent member such as an acrylic member, and includes a first reflection section 153 and a second reflection section 154 as in the configuration of Embodiment 1. The first reflection section 153 and the second reflection section 154 for example have silver plating or coating of a highly reflective material such as $TiO_2$. The light reflection device 152 according to Embodiment 2 further has a coupling member 155a.

As in the configuration of Embodiment 1, a shape defined by a periphery of the first reflection section 153 is square in a front elevation view, and the second reflection section 154 has an inclined surface 160, which is also made of a transparent member such as an acrylic member, and has a square shape having a central opening. The periphery of the first reflection section 153 and an inner periphery of the second reflection section 154 are coupled by the coupling member 155a.

Specifically, the coupling member 155a has a hollow rectangular shape with two opposing open faces and is provided along the periphery of the first reflection section 153. The light reflection device 152 is mounted in the light source apparatus 12 with the coupling member 155a extending in a direction from the periphery of the first reflection section 153 toward a substrate 16. The coupling member 155a has a front end connected with the periphery of the first reflection section 153 and a back end connected with the inner periphery of the second reflection section 154.

The first reflection section 153, the second reflection section 154, and the coupling member 155a are for example formed as a single piece from a transparent material such as an acrylic material or glass. Consequently, light reflected by a first reflection surface 157 (not shown) of the first reflection section 153 can pass through the coupling member 155a to be incident on the second reflection surface 160 of the second reflection section 154.

Other than those described above, the light reflection device 152 according to Embodiment 2 has the same configuration as Embodiment 1. Elements of configuration of Embodiment 2 that are shared with Embodiment 1 are labelled using the same reference signs, and detailed description thereof is omitted.

Embodiment 3

Figure 13:
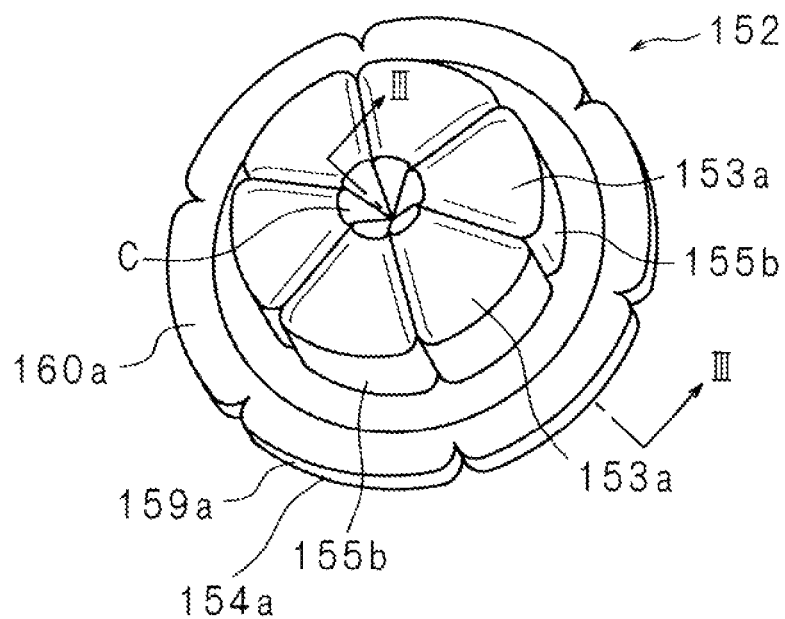
FIG. 13 is a perspective view illustrating an external appearance of a light reflection device mounted in a light source apparatus of a television receiver according to Embodiment 3 as seen from the front.
Figure 14A:
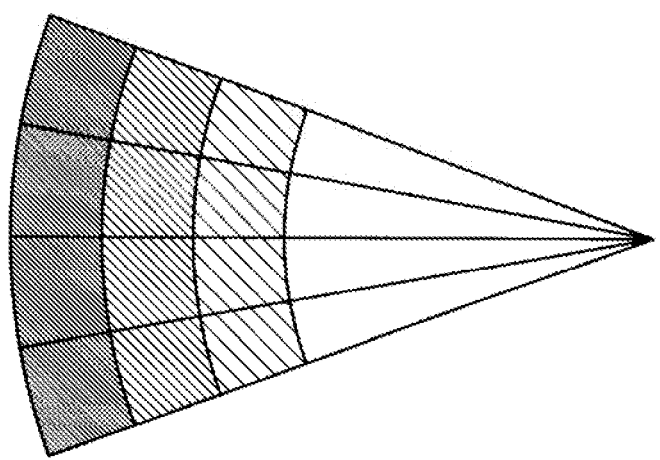
FIGS. 14A and 14B are diagrams illustrating light paths in a light source device and a light flux distribution on a liquid-crystal panel in the television receiver according to Embodiment 3.
Figure 14B:
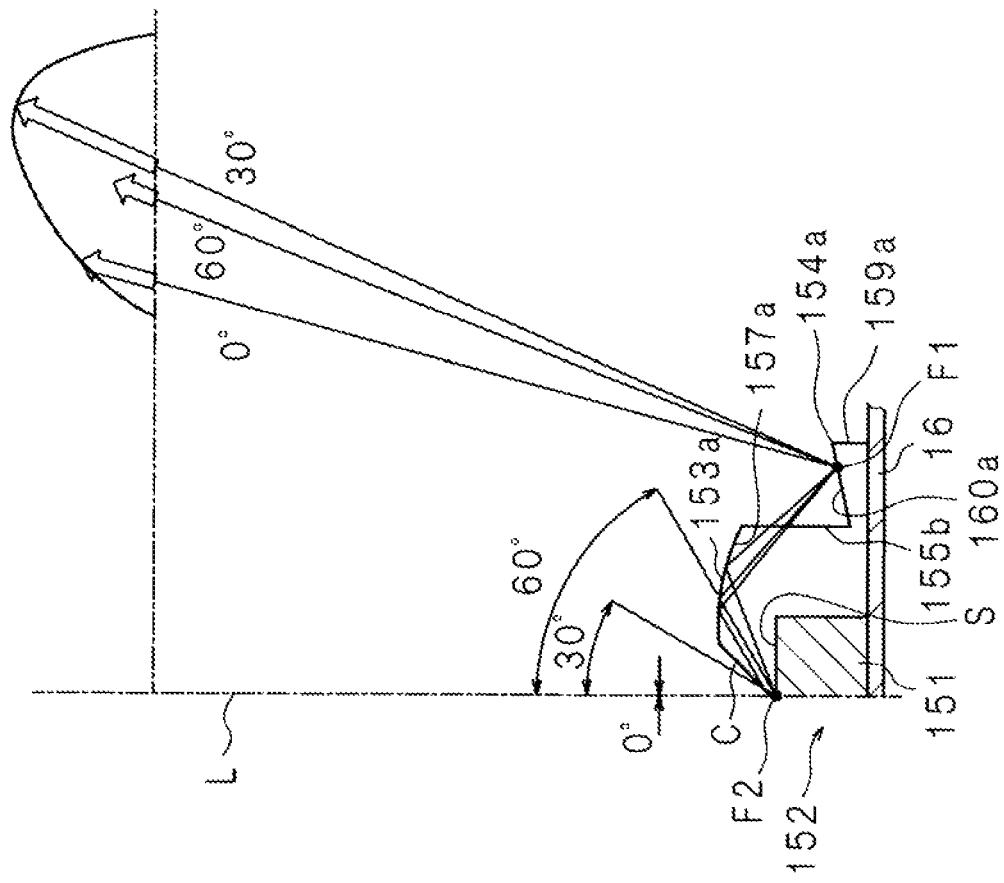

FIG. 13 is a perspective view illustrating an external appearance of a light reflection device 152 mounted in a light source apparatus 12 of a television receiver 100 according to Embodiment 3 as seen from the front. FIGS. 14A and 14B are diagrams illustrating light paths in a light source device 15 and a light flux distribution on a liquid-crystal panel 11 in the television receiver 100 according to Embodiment 3. FIG. 14B is a cross-sectional view taken along line in FIG. 13.

The light reflection device 152 has a first reflection section 153a and a second reflection section 154a respectively having the same functions as the first reflection section 153 and the second reflection section 154 according to Embodiment 1.

The first reflection section 153a is formed of six protrusions having the same shape, and a shape defined by a periphery of the first reflection section 153a is substantially circular in a front elevation view. The first reflection section 153a has a substantially semispherical recess C in a central region thereof. Each of the protrusions is substantially in the shape of a minor arc in a front elevation view and has a curved surface protruding toward the liquid-crystal panel 11. The first reflection section 153a also has grooves elongated along joint portions of the protrusions.

The first reflection section 153a has a first reflection surface 157a, which is inner surfaces (back surfaces) of the recess C and the six protrusions, for reflecting light emitted from an LED 151 toward the second reflection section 154a.

The second reflection section 154a is in the shape of a ring in a front elevation view and has cut-outs along radial directions of the first reflection section 153a at locations corresponding to the grooves. The second reflection section 154a has a surrounding surface 159a that surrounds the LED 151 when the light reflection device 152 is mounted in the light source apparatus 12 and an inclined surface 160a continuous from a front end of the surrounding surface 159a. The inclined surface 160a is a second reflection surface that reflects light reflected by the first reflection surface 157a toward the liquid-crystal panel 11. In the light reflection device 152 mounted in the light source apparatus 12, a distance from an outer periphery of the inclined surface 160a to a mounting surface 161 of a substrate 16 is longer than a distance from an inner periphery of the inclined surface 160a to the mounting surface 161.

As described above, the shape defined by the periphery of the first reflection section 153a is circular in a front elevation view, and the inclined surface 160a of the second reflection section 154a is in the shape of a ring. The periphery of the first reflection section 153a and the inner periphery of the second reflection section 154a are coupled by a coupling member 155b.

Specifically, the coupling member 155b has a hollow cylindrical shape with two opposing open faces and is provided along the periphery of the first reflection section 153a. The light reflection device 152 is mounted in the light source apparatus 12 with the coupling member 155b extending in a direction from the periphery of the first reflection section 153a toward the substrate 16. The coupling member 155b has a front end connected with the periphery of the first reflection section 153a and a back end connected with the inner periphery of the second reflection section 154a. The coupling member 155b has grooves elongated along the front-back direction at locations corresponding to the grooves of the first reflection section 153a.

The first reflection section 153a, the second reflection section 154a, and the coupling member 155b are for example formed as a single piece from a transparent material such as an acrylic material or glass. Consequently, light reflected by a first reflection surface 157a (not shown) of the first reflection section 153a can pass through the coupling member 155b to be incident on the second reflection surface 160a of the second reflection section 154a.

With respect to the light reflection device 152 according to Embodiment 3, a point of exit of light on a light exit surface S of the LED 151 and a point on the second reflection surface 160a of the second reflection section 154a are two foci of a specific ellipse. That is, a first focus (F1) of the specific ellipse is present on the second reflection surface 160a of the second reflection section 154a, and a second focus (F2) of the specific ellipse is present on the light exit surface S of the LED 151. On a cross-section of the first reflection section 153a taken along a plane including the two foci, an intersection line between the first reflection surface 157a and the plane matches the specific ellipse.

Accordingly, in the light source device 15, light emitted from the light exit surface S of the LED 151 is reflected by the first reflection surface 157a of the first reflection section 153a, reaches the second reflection surface 160a of the second reflection section 154a without fail, and is reflected by the second reflection surface 160a toward the liquid-crystal panel 11.

As illustrated in FIG. 14B, rays of light emitted from the light exit surface S (F2) of the LED 151 at respective angles of for example 0° and 30° relative to an optical axis L of the LED 151 are first reflected by a region of the first reflection surface 157a first reflection surface 157a corresponding to the inner surface of one of the six protrusions toward the second reflection surface 160a (F1) of the second reflection section 154a. By contrast, a ray of light emitted at an angle of 60° relative to the optical axis L is reflected by a region of the first reflection surface 157a corresponding to one of the six protrusions, reaches the second reflection surface 160a (F1) of the second reflection section 154a, and then is reflected by the second reflection surface 160a toward the liquid-crystal panel 11.

As understood from FIG. 14A illustrating a light flux distribution resulting from one of the protrusions of the first reflection section 153a, the light source device 15 according to Embodiment 3 is used to give a higher light flux density on the liquid-crystal panel 11 in regions closer to regions corresponding to the periphery of the first reflection section 153a.

The use of the light source device 15 according to Embodiment 3 therefore enables the achievement of an even light flux distribution compared to conventional technology that offers a light flux distribution in a toroidal shape in which a high light flux density region and a low light flux density region are distinctly separated.

Other than those described above, the light reflection device 152 according to Embodiment 3 has the same configuration as Embodiment 1. Elements of configuration of Embodiment 3 that are shared with Embodiment 1 are labelled using the same reference signs, and detailed description thereof is omitted.

Embodiment 4

Figure 15:
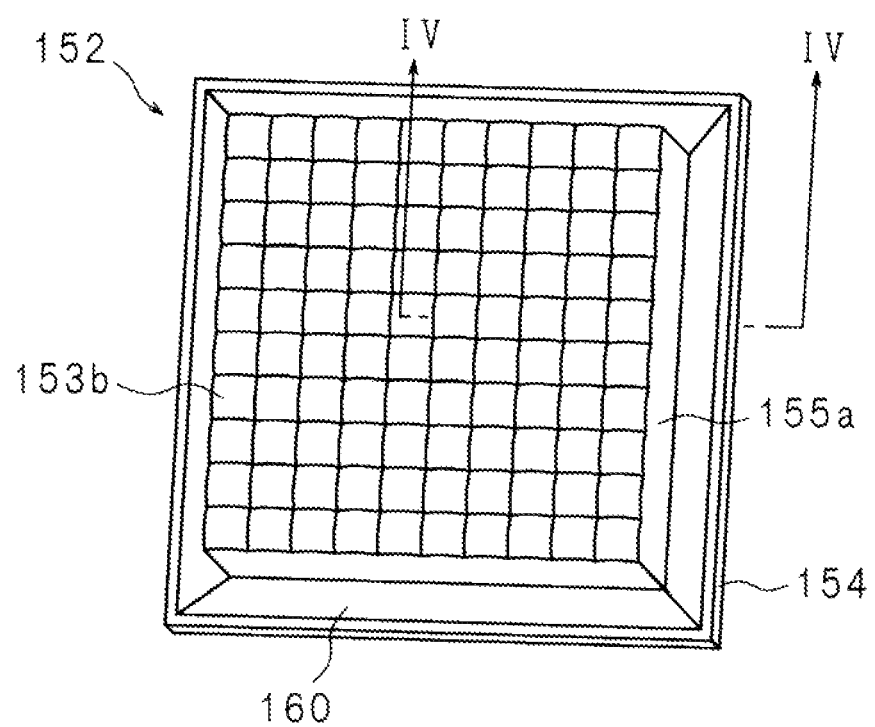
FIG. 15 is a perspective view illustrating an external appearance of a light reflection device mounted in a light source apparatus of a television receiver according to Embodiment 4 as seen from the front.
Figure 16B:
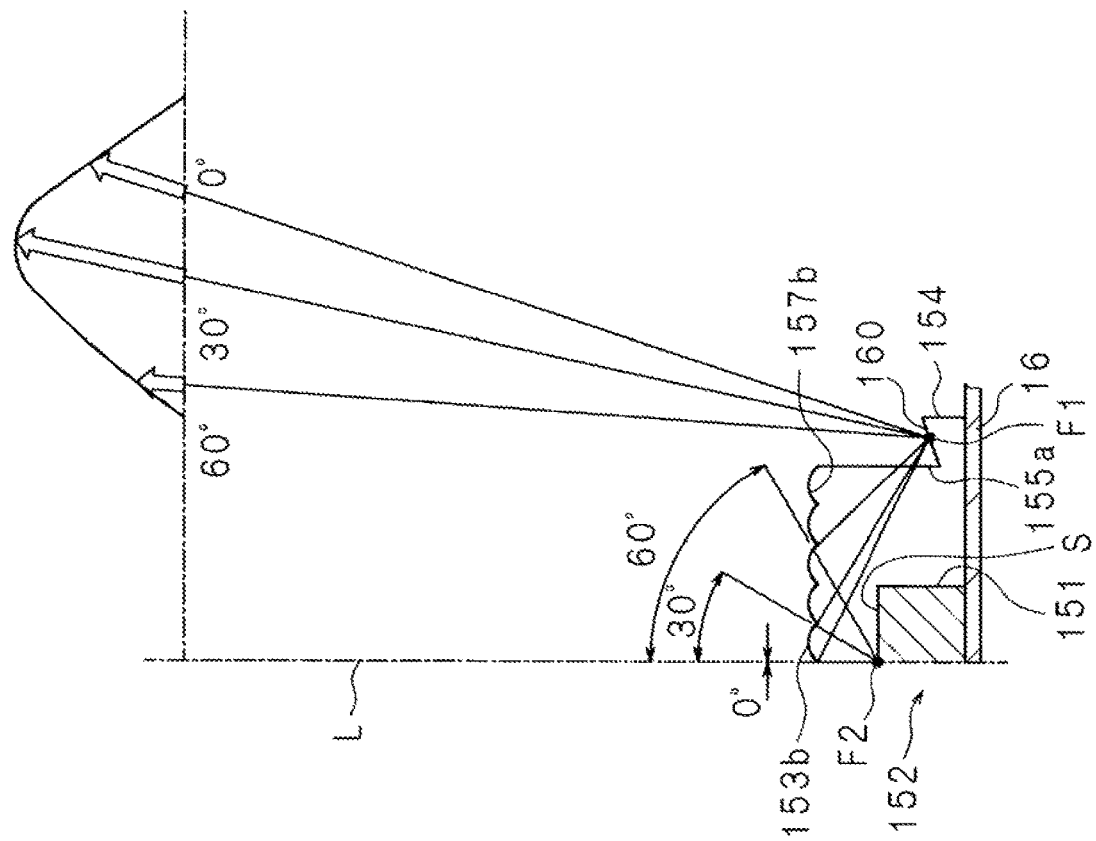
FIGS. 16A and 16B are diagrams illustrating light paths in a light source device and a light flux distribution on a liquid-crystal panel in the television receiver according to Embodiment 4.
Figure 16A:
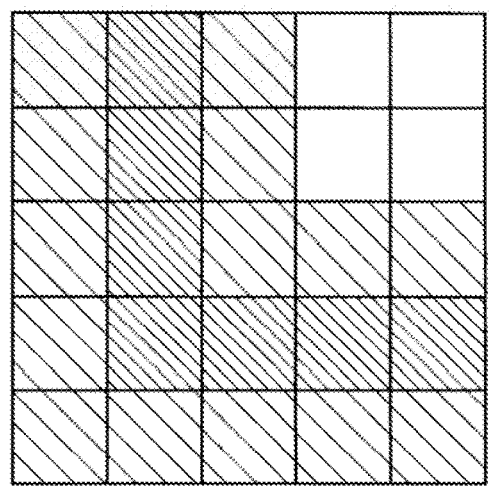

FIG. 15 is a perspective view illustrating an external appearance of a light reflection device 152 mounted in a light source apparatus 12 of a television receiver 100 according to Embodiment 4 as seen from the front. FIGS. 16A and 16B are diagrams illustrating light paths in a light source device 15 and a light flux distribution on a liquid-crystal panel 11 in the television receiver 100 according to Embodiment 4. FIG. 16B is a cross-sectional view taken along line IV-IV in FIG. 15.

The light reflection device 152 according to Embodiment 4 has a second reflection section 154 and a coupling member 155a having the same configuration as Embodiment 2, and has a first reflection section 153b having a different configuration from the first reflection section 153 according to Embodiment 2.

The first reflection section 153b is formed of a plurality of protrusions (for example, 100 protrusions) having the same shape and arranged in a matrix. A shape defined by a periphery of the first reflection section 153b is substantially square in a front elevation view. Each of the protrusions protrudes toward the liquid-crystal panel 11, and the first reflection section 153b has an outer surface with a corrugated cross-section taken along the front-back direction (see FIG. 6B).

The first reflection section 153b has a first reflection surface 157b, which is inner surfaces of the protrusions arranged in a matrix, for reflecting light emitted from an LED 151 toward the second reflection section 154. Specifically, the first reflection surface 157b is formed of a plurality of concave surfaces having the same shape and arranged in a matrix. The first reflection surface 157b therefore has a corrugated cross-section taken along the front-back direction (see FIG. 16B).

With respect to the light reflection device 152 according to Embodiment 4, a plurality of concave surfaces are formed as the first reflection surface 157b of the first reflection section 153b. The concave surfaces are portions of ellipses each having, as foci thereof, a second focus (F2) on a light exit surface S of the LED 151 and a first focus (F1) on a second reflection surface 160 of the second reflection section 154.

Accordingly, in the light source device 15, light emitted from the light exit surface S of the LED 151 is reflected by the first reflection surface 157b of the first reflection section 153b, reaches the second reflection surface 160 of the second reflection section 154 without fail, and is reflected by the second reflection surface 160 toward the liquid-crystal panel 11.

As illustrated in FIG. 16B, rays of light emitted from the light exit surface S (F2) of the LED 151 at respective angles of for example 0°, 30°, and 60° relative to an optical axis L of the LED 151 are reflected by different regions of the first reflection surface 157b corresponding to different protrusions among the plurality of protrusions, reach the second reflection surface 160 (F1) of the second reflection section 154, and then are reflected by the second reflection surface 160 toward the liquid-crystal panel 11.

As illustrated in FIG. 16A, the use of the light source device 15 according to Embodiment 4 enables the achievement of an entirely even light flux distribution on the liquid-crystal panel 11 in which regions having an extremely high light flux density account for a small proportion and regions having an extremely low light flux density also account for a small proportion.

Other than those described above, the light reflection device 152 according to Embodiment 4 has the same configuration as Embodiment 2. Elements of configuration of Embodiment 4 that are shared with Embodiment 2 are labelled using the same reference signs, and detailed description thereof is omitted.

Embodiments 1 to 4 are each described using a configuration in which the first reflection section. 153, 153a, or 153b of the light reflection device 152 is formed of an even number of (four or six) protrusions. However, the first reflection section 153, 153a, or 153b may be formed of an odd number of (for example, three or five) protrusions as mentioned above. The shape of the first reflection surface 157, 157a, or 157b formed of an even number of protrusions includes joined two curves (portions of ellipses) symmetric about the optical axis of the LED 151 on each plane including the optical axis. The shape of the first reflection surface 157, 157a, or 157b formed of an odd number of protrusions includes joined two curves (portions of ellipses) asymmetric about the optical axis of the LED 151 on each plane including the optical axis. Those skilled in the art who have read the present description will readily appreciate that the light reflection device 152 and the light source device 15 having a configuration in which the shape of the first reflection surface 157, 157a, or 157b includes portions of two ellipses asymmetric about the optical axis on each plane including the optical axis can also fulfill desired functions, as long as the first focus of each of the ellipses is on the second reflection surface 160 or 160a and the second focus of each of the ellipses is on the light exit surface S of the LED 151.

REFERENCE SIGNS LIST

15 Light source device
151 LED (light source)
152 Light reflection device
153, 153a, 153b First reflection section (roof)
155 Leg
155f, 155r End
157, 157a, 157b First reflection surface
160, 160a Inclined surface (second reflection surface)
E1, E2 Ellipse
L Optical axis
S Light exit surface

The invention claimed is:
1. A light reflection device comprising:
a first reflection surface configured to reflect light from a light exit surface of a light source;
a second reflection surface configured to reflect the light reflected by the first reflection surface in a direction of light emission from the light exit surface;
a roof;
a plurality of legs; and
a reflection section; wherein the first reflection surface has a shape including two portions of respective ellipses on a plane including an optical axis of the light source, the two portions being joined at the optical axis, a first focus of each of the ellipses is located on the second reflection surface, an angle between the optical axis of the light source and the direction of the light reflected by the second reflection surface is less than 90° on the plane including the optical axis when the light source is in a position that allows a second focus of each of the ellipses to be located on the light exit surface, the first reflection surface is an inner surface of the roof, the legs position the roof with the first reflection surface facing the light exit surface of the light source, the second reflection surface is a surface of the reflection section, and each of the legs has a first end connected with a periphery of the roof and a second end connected with the reflection section.

2. The light reflection device according to claim 1, wherein
the second reflection surface has beads applied thereto.

3. The light reflection device according to claim 1, wherein
the second reflection surface is a knurled surface.

4. A light source device comprising:
a light source; and
the light reflection device according to claim 1, wherein
the light source is disposed with a light exit surface thereof facing the first reflection surface.

5. A light source device comprising:
a plurality of light sources; and
the light reflection device according to claim 1, wherein
each of the plurality of light sources is disposed with a light exit surface thereof facing the first reflection surface, the periphery of the roof defines a polygonal shape expanding from an optical axis of one of the plurality of light sources in directions orthogonal to the optical axis, and the roof is provided in combination with the plurality of light sources.

6. The light reflection device according to claim 1, wherein
the roof has a shape formed of joined protrusions having the same shape,
each of the protrusions is arch-shaped and has an outer surface projecting outward, and
the first reflection surface is inner surfaces of the protrusions and includes a plurality of concave surfaces having the same shape.

7. The light reflection device according to claim 1, comprising:
a roof;
a coupling member having a hollow shape with two opposing open faces; and
a reflection section, wherein
the first reflection surface is an inner surface of the roof,
the second reflection surface is a surface of the reflection section, and
the coupling member is made of a transparent material and couples a periphery of the roof and an inner periphery of the reflection section.

8. The light reflection device according to claim 7, wherein
the roof has a semispherical recess, and
the semispherical recess is located in a central region of the roof.

9. The light reflection device according to claim 7, wherein
the roof has a shape formed of joined protrusions having the same shape,
an outer surface of the roof has a corrugated cross-section, and
the protrusions are arranged in a matrix.

* * * * *